United States Patent Office 3,008,944
Patented Nov. 14, 1961

3,008,944
PRODUCTION OF SOLID POLYMERS
OF DIOLEFINS
Lawrence V. Wilson, Jr., Bartlesville, Okla., assignor to Phillips Petroleum Company, a corporation of Delaware
No Drawing. Filed Aug. 16, 1957, Ser. No. 678,548
9 Claims. (Cl. 260—94.3)

This invention relates to solid polymers of diolefins produced in the presence of a chromium oxide containing catalyst. In one aspect, it relates to a process for polymerizing diolefins in the presence of a chromium oxide containing catalyst. In another aspect, it relates to the stabilization of solid diolefin polymers prepared in the presence of a chromium oxide containing catalyst.

It has recently been discovered, as disclosed in the copending U.S. patent application of J. P. Hogan and R. L. Banks, Serial No. 573,877, filed March 26, 1956, now Patent No. 2,825,721, that unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly an oxide selected from the group consisting of silica, alumina, zirconia, and thoria. The olefin feed used in the polymerization is at least one olefin selected from a class of 1-olefins having a maximum of 8 carbon atoms per molecule and no branching nearer the double bond than the 4-position. The instant invention is concerned with the stabilization of diolefin polymers.

It is an object of this invention to provide an improved process for the polymerization of diolefins in the presence of a chromium oxide-containing catalyst.

Another object of the invention is to provide a process for stabilizing diolefin polymers prepared in the presence of a chromium oxide containing catalyst.

A further object of the invention is to provide a process for destroying the pyrophoric properties of diolefin polymer-chromium oxide catalyst mixtures.

Other and further objects and advantages of the invention will become apparent to those skilled in the art upon consideration of the accompanying disclosure.

The instant invention resides in an improvement in a process for polymerizing diolefins in the presence of a chromium oxide containing catalyst. Broadly speaking, the improvement comprises adding a non-oxidizing catalyst poison to the polymer product containing catalyst prior to exposure of this material to the atmosphere. The product obtained by polymerizing diolefins as described herein is a high molecular weight, resinous polymer which appears to be highly cross-linked. Infrared studies of the polybutadiene product have revealed that more than 95 percent of it has a trans-1,4 configuration. The trans-polybutadiene is very difficultly soluble in hot toluene, has no definite melting point, and has to be heated to about 600° F. before fusion occurs. Because of the insoluble nature of this very tough polymer, it is impracticable to remove the catalyst prior to use of the polymer. In view of the high yields obtainable when polymerizing diolefins in the presence of the chromium oxide containing catalyst, the amount of catalyst present in the polymer product is very small and does not effect the suitability of the polymer for most uses. However, it has been found that the polymer-chromium oxide catalyst mixture is pyrophoric in nature and that exposure of this material to the atmosphere results in its catching fire or smoldering. As indicated hereinbefore, this invention is concerned with a process for destroying the pyrophoric characteristics of the polymer-catalyst mixture prior to its coming into contact with air.

The instant invention is applicable to the treatment of polymer-catalyst mixtures prepared by polymerizing conjugated diolefins in the presence of a chromium oxide containing catalyst. The conjugated diolefins so polymerized contain a maximum of 8 carbon atoms, have no branching nearer the double bond than the 3-position, and have at least one terminal double bond. The invention is particularly applicable to polymers of the conjugated diolefins 1,3-butadiene and isoprene.

The catalyst utilized in preparing the diolefin polymers comprises as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria.

The catalyst can be prepared by preparation methods which are known in the art, e.g., direct mixing of solid components, impregnation, etc. In order to obtain optimum activity, it is preferred that the catalyst mixture comprising chromium oxide and the additional oxide as hereinbefore specified be heated under elevated temperature and for a sufficient time to activate, or increase the activity of, the catalyst for the polymerization reaction. It is also preferred that the catalyst be heated under non-reducing conditions in an atmosphere such as oxygen, air, nitrogen, carbon dioxide, helium, argon, krypton, or xenon. Reducing gases such as hydrogen or carbon monoxide can be present in said atmosphere where the time of contact with the catalyst, especially at the higher temperatures, is limited to prevent extensive reduction of the hexavalent chromium; however, the presence of such gases, and of reducing agents in general, is ordinarily not desired. It is ordinarily preferred that the activation atmosphere be non-reducing. It is further preferred that the atmosphere be positively oxidizing, e.g., air or oxygen. The temperature and time of activation can vary over wide ranges and are closely interrelated (so-called "time-temperature effect"), longer times being required at lower temperatures and shorter times at higher temperatures. Catalysts prepared by milling solid silica, alumina, zirconia and/or thoria with solid oxide are activatable at lower temperatures than are catalysts prepared by impregnating silica, alumina, zirconia and/or thoria with an aqueous solution of a chromium compound. As a practical matter, a catalyst prepared by dry mixing is ordinarily activated at a temperature of at least about 350° F. and not substantially greater than about 1500° F. A catalyst prepared by impregnation with an aqueous solution is ordinarily activated at a temperature of at least about 450° F. and not substantially greater than 1500° F. Times of activation can range from about a second at the highest temperatures to 50 hours or more at the lowest temperatures. The stated numerical values are given as illustrative of the most practical ranges and are not absolute limits. By using very short times and high temperatures, or very long times and lower temperatures, catalysts having various degrees of increased activation are obtainable.

The chromium oxide catalyst can be prepared by impregnation of particulate silica, alumina, or silica-alumina, for example, with a solution of chromium oxide or a compound convertible to chromium oxide by calcination, followed by drying and activation of the composite at a temperature in the range of 450 to 1500° F., preferably 750 to 1500° F., for a period of 3 to 10 hours or more. Activation is conducted by heating in a stream of gas. It is preferred that the gas contain oxygen and be substantially water-free. Preferably the dew point of the activation gas should be below 75° F., more preferably below 0° F. However, inert gases, such as carbon dioxide and nitrogen, can be used. The catalyst can be prepared using, as starting material, chromium trioxide, chromic nitrate, chromic acetate, chromic chloride, chromic sulfate, ammonium chromate, ammonium dichromate, or other soluble salts of chromium. The highest conversions were obtained from the catalyst that contained only chromium oxides after activation. Impregnation with chromium trioxide ($CrO_3$) is preferred, although chromic nitrate can be used with similar results. It is believed that the catalyst prepared from the chloride and that prepared from the sulfate are at least partially converted to oxide during activation. The amount of chromium, as chromium oxide, in the catalyst can range from 0.1 to 10 or more weight percent and is ordinarily a minor component of the catalyst in terms of weight percent. A preferred non-chromium component or "support" is a silica-alumina composite containing a major proportion of silica and a minor proportion of alumina. While the method of preparing the silica-alumina composite undoubtedly affects the catalyst activity to some extent, it appears that silica-alumina composites prepared by any of the prior art processes for preparing such catalytically active composites are operative for the process of this invention. Coprecipitation and impregnation are examples of such processes. One support that has been found particularly effective is a coprecipitated 90 percent silica-10 percent alumina support. It is found that steam treatment of certain commercially available forms of silica-alumina, or silica without appreciable alumina, improves the activity and life of the catalyst composite in a polymerization reaction. A silica support of lower surface area and larger pore size is a better support than one having extremely high surface area and small pore size. A chromium oxide-alumina catalyst ordinarily has about two-thirds the activity of a chromium oxide-silica-alumina catalyst. It is necessary for some of the chromium to be in the hexavalent state to act as an active promoter or catalyst for the polymerization reaction. It is preferred to us catalyst in which the amount of hexavalent chromium is at least 0.1 percent of the weight of the catalyst composite, at least at the initial contacting with the hydrocarbon. The hexavalent chromium is determined by ascertaining the water-soluble chromium present by leaching with water and determining the dissolved chromium in the leachings by any suitable analytical method known in the art, e.g., addition of potassium iodide solution and titration of the liberated iodine with sodium thiosulfate solution.

The preferred steam activation of certain silica-alumina bases, previously mentioned, is conducted at a temperature of approximately 1200° F. for 10 hours utilizing 5 volume percent steam admixed with 95 volume percent air. In the steam activation treatment, the temperature can be varied from 1100 to 1300° F. and the steam content of the steam-air mixture can range from about 3 to about 10 percent. The time of treatment can vary from about 4 to about 15 hours.

Another suitable "base" or "support" for the catalyst is microspherical silica-alumina containing, for example, 10 to 15 weight percent alumina.

The catalyst is employed in the form of a relatively fine powder so that it can be easily maintained in suspension or as a slurry in the reaction mixture. The catalyst powder generally has a particle size of 30 mesh and smaller, preferably 50 mesh and smaller. While the catalyst size is not critical, it should be small enough so that it can be readily maintained as a slurry in the reaction mixture. The catalyst is usually maintained in suspension by a mechanical agitation device and/or by virtue of the velocity of the incoming diolefin feed and/or solvent. The concentration of the catalyst in the reaction zone can vary within wide limits, e.g., from 0.01 to 10 and higher weight percent, based on the diolefin. However, because of the high yields and rates of reactions obtained when using the chromium oxide containing catalyst to polymerize diolefins, it is generally preferred to employ very small amounts of catalyst, e.g., from 0.01 to 1 weight percent of catalyst. It has been found that reaction rates above 500 pounds of diolefins per hour and total yields of over 2,000 pounds of polymer, based on one pound of catalyst, are readily obtainable. Accordingly, it is ordinarily undesirable from practical considerations to use other than very small amounts of the catalyst in the polymerization process.

A satisfactory method of conducting the polymerization, as disclosed in the above-cited Hogan and Banks patent, comprises contacting a diolefin with a slurry of catalyst in a hydrocarbon solvent which can exist as a liquid at the temperature of polymerization. In such an operation, the reaction pressure need only be sufficient to maintain the solvent substantially in the liquid phase and will ordinarily range from about 100 to about 700 p.s.i.

Suitable solvents for use in the above-described process are hydrocarbons which are liquid and chemically inert under the reaction conditions. Solvents which can be advantageously used include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above defined general class is constituted by those naphthenic hydrocarbons having from 5 to 6 carbon atoms in a single ring and from 0 to 2 methyl groups as the only substituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

Another method which can be advantageously used in conducting the polymerization of diolefins is when the diolefin is contacted with a suspension of chromium oxide containing catalyst in the diolefin, the contacting occurring in the absence of a hydrocarbon diluent. The reaction mixture consists essentially of at least one diolefin in the liquid phase, diolefin polymer and catalyst, the diolefin being the sole unpolymerized liquid material present in the reaction mixture. The pressure in the reaction zone is, in general, high enough to maintain the diolefin in the liquid phase. This pressure is generally between 100 and 300 p.s.i., depending on the particular diolefin and the polymerization temperature. A pressure of approximately 500 p.s.i. is often preferred and, if desired, the pressure can be as high as 700 p.s.i. or higher.

The temperature used in carrying out the polymerization of diolefins in accordance with the above described processes can vary over a broad range. The temperature normally ranges from about 100 to about 500° F., with temperatures in the range from about 100 to 300° F. being preferred.

The polymerization of diolefins can be carried out continuously by maintaining the above-described concentrations of reactants in the reactor for a suitable residence time. The residence or contact time used in a continuous process can vary for any given set of operating conditions and will depend to some degree upon economical considerations. For example, the contact time for any set of operating conditions should not be so long as to allow an excessive concentration of polymer to build up in the reactor. The contact time also varies with the specific diolefin that is polymerized. However, the contact time is usually in the range of 0.5 to 10 hours, preferably from 2 to 6 hours. The polymerization processes can also be carried out batchwise, and in some instances, a batch operation may be very desirable. Thus, the batch process lends itself to the production of the polymer in which the ash content can be very closely controlled so as to obtain a product of specification quality. The polymer recovered from the polymerization reactor is ordinarily in solid particle form and can be easily separated from unreacted diolefin by filtration.

As previously discussed, exposure of the polymer product to the atmosphere results in the material catching fire and smoldering. In accordance with the instant invention, the pyrophoric characteristics of the polymer-catalyst mixture are destroyed by contacting the mixture with a non-oxidizing catalyst poison, i.e., a non-oxidizing material which inactivates the catalyst. Various materials can be employed as poisons to destroy the pyrophoric properties of the polymer product, including water, carbon monoxide, ketones, alcohols, ethers, and amines. Suitable ketones include acetone, methyl ethyl ketone, methyl butyl ketone, diethyl ketone, and the like, while ethers such as dimethyl ether, diethyl ether, methyl ethyl ether, ethyl propyl ether, and the like, can be advantageously employed. Various alcohols can be used, including such alcohols as methyl alcohol, ethyl alcohol, normal or isopropyl alcohol, and the like. Examples of amines which can be suitably utilized include monoethylamine, diethylamine, monoethanolamine, diethanolamine, phenyl-β-naphthylamine, and the like. In a continuous system, the non-oxidizing catalyst poison can be added to the reactor effluent or at any other suitable point depending on the details of the particular operation. In a batch polymerization system, the catalyst poison can be advantageously added to the reactor after the polymerization cycle has been completed. Only very small amounts of the catalyst poison are ordinarily required. For example, amounts in the range of 5 to 100 weight percent, based upon the amount of catalyst to be poisoned, are ordinarily sufficient to destroy the pyrophoric characteristics of the polymer-catalyst mixture. However, larger amounts of the catalyst poison can be employed if so desired.

As mentioned hereinbefore, the polymer product of this invention is in solid particle form. Because of the particle form of the polymer, separation of the polymer from liquids can be readily and easily accomplished. Thus, after addition of the non-oxidizing catalyst poison, the reaction mixture comprising a mixture of solid polymer particles containing catalyst, liquid conjugated diolefin, solvent, if used in the polymerization, and catalyst poison can be conveniently passed into a separation zone wherein the solid polymer and liquid materials are separated. The separation zone can comprise any suitable separation means, such as a filter, centrifuge, settling tank, or other suitable means for accomplishing the separation of a liquid from solids. The polymer in particle form recovered from the separation zone can then be passed into a drier wherein it is heated so as to vaporize any liquid which is present. The liquid materials contained in the reaction mixture can also be separated from the polymer merely by flashing off the liquid hydrocarbons.

A more complete understanding of the invention may be obtained by referring to the following illustrative examples which are not intended, however, to be unduly limitative of the invention.

*Example I*

In this example, 1,3-butadiene was polymerized in the presence of a chromium oxide containing catalyst, utilizing cyclohexane as the solvent. The catalyst used was prepared by the impregnation of silica-alumina coprecipitated composite with a chromium trioxide solution. The silica-alumina composite comprised 90 weight percent silica and 10 weight percent alumina. The resulting composite was dried and activated with dry air for 5 hours at 950° F. The final catalyst contained 2.40 weight percent chromium as chromium oxide with 1.5 weight percent being hexavalent chromium. Approximately 0.75 pound of cyclohexane was present in the reactor, and about 0.50 pound of 1,3-butadiene was charged to the reactor during the run. The polymerization temperature, which was initially at 200° F., increased to 332° F. as the polymerization proceeded. The concentration of catalyst in the reactor was 2.35 weight percent, based on the cyclohexane present in the reactor. At the end of 45 minutes, the polymer was removed from the reactor and exposed to the atmosphere. In a few minutes, it was observed that the polymer had begun to smolder.

*Example II*

In this example, a catalyst similar to that described hereinabove in Example I was used to polymerize 1,3-butadiene. Cyclohexane was employed as the solvent, and the concentration of catalyst in the reactor was about 0.35 weight percent, based on the amount of solvent. As in Example I, about 0.75 pound of cyclohexane was present in the reactor and about 0.50 pound of 1,3-butadiene was added during the run. The temperature was maintained at about 235° F. with the pressure being about 425 p.s.i.g. At the end of 3 hours, 10 cc. of isopropyl alcohol containing 2 grams of phenyl-β-naphthylamine was injected into the reactor. The polymer product on removal from the reactor was dumped into a solution of phenyl-β-naphthylamine in alcohol. When the polymer product was subsequently exposed to the atmosphere, it was noted that no smoldering of the polymer occurred, indicating that the pyrophoric characteristics of the material had been effectively destroyed by treatment with the alcohol solution.

The product produced in accordance with the instant invention can be used in the preparation of ion exchange resins. When used with a suitable plasticizer, the diolefin polymers are also useful as sealing compositions.

It will be apparent to those skilled in the art that variations and modifications of the invention can be made from the foregoing disclosure. Such variations and modifications are believed to be clearly within the spirit and scope of the invention.

I claim:

1. In a process for polymerizing conjugated diolefins, containing a maximum of 8 carbon atoms per molecule and having at least one terminal double bond, which comprises contacting at least one of said conjugated diolefins with a chromium oxide containing catalyst and thereby producing a solid polymer-catalyst mixture, the improvement which comprises contacting said mixture with a non-oxidizing material selected from the group consisting of water, carbon monoxide, ketones, alcohols, ethers and amines, said contacting occurring prior to exposure of said mixture to the atmosphere.

2. A process according to claim 1 wherein said conjugated diolefin is 1,3-butadiene.

3. The process according to claim 1 wherein said conjugated diolefin is isoprene.

4. The process according to claim 1 wherein said non-oxidizing material is water.

5. The process according to claim 1 wherein said non-oxidizing material is an amine.

6. The process according to claim 1 wherein said non-oxidizing material is an alcohol.

7. The process according to claim 6 wherein said alcohol is isopropyl alcohol.

8. The process according to claim 7 wherein said amine is phenyl-β-naphthylamine.

9. In a process for polymerizing conjugated diolefins, containing a maximum of 8 carbon atoms per molecule and having at least one terminal double bond, which comprises contacting in a reaction zone at least one of said conjugated diolefins with a catalyst comprising a minor amount of chromium in the form of chromium oxide, and containing a substantial amount of hexavalent chromium, associated with at least one oxide selected from the group consisting of silica, alumina, zirconia, and thoria, at a temperature in the range of 100 to 500° F. and at a pressure sufficient to maintain said conjugated diolefin in the liquid phase, thereby polymerizing said conjugated diolefin and forming solid diolefin polymer, the improvement which comprises adding to said reaction zone after said polymerizing of said conjugated diolefin is completed a non-oxidizing material selected from the group consisting of water, carbon monoxide, ketones, alcohols, ethers, and amines, the addition of said non-oxidizing material occurring prior to exposure of said diolefin polymer to air; and thereafter recovering said diolefin polymer from said reaction zone.

References Cited in the file of this patent

UNITED STATES PATENTS

| | | |
|---|---|---|
| 2,209,746 | Ebert et al. | July 30, 1940 |
| 2,606,179 | Boyd | Aug. 5, 1952 |
| 2,714,620 | Leary | Aug. 2, 1955 |
| 2,813,136 | Mertz | Nov. 12, 1957 |
| 2,825,721 | Hogan et al. | Mar. 4, 1958 |
| 2,832,759 | Nowlin et al. | Apr. 29, 1958 |
| 2,890,214 | Brightbill et al. | June 9, 1959 |
| 2,899,418 | Reynolds | Aug. 11, 1959 |